(12) United States Patent
Duine et al.

(10) Patent No.: US 7,068,910 B2
(45) Date of Patent: Jun. 27, 2006

(54) LIGHT GENERATING DEVICE HAVING POLARIZED LIGHT EMITTING WAVEGUIDE PLATE

(75) Inventors: Peter Alexander Duine, Eindhoven (NL); Hugo Johan Cornelissen, Eindhoven (NL); Tijsbert Mathieu Henricus Creemers, Nijmegen (NL); Johannes Marra, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/527,952

(22) PCT Filed: Aug. 8, 2003

(86) PCT No.: PCT/IB03/03547

§ 371 (c)(1),
(2), (4) Date: Mar. 15, 2005

(87) PCT Pub. No.: WO2004/027466

PCT Pub. Date: Apr. 1, 2004

(65) Prior Publication Data

US 2006/0110123 A1 May 25, 2006

(30) Foreign Application Priority Data

Sep. 18, 2002 (EP) .................................. 02078869

(51) Int. Cl.
*G02B 6/10* (2006.01)
(52) U.S. Cl. ........................... 385/146; 385/11; 385/31
(58) Field of Classification Search .............. 385/5–12, 385/14, 31, 146, 901; 345/87, 89, 90, 102
See application file for complete search history.

(56) References Cited

U.S. PATENT DOCUMENTS

2004/0105617 A1* 6/2004 Cornelissen et al. .......... 385/31

* cited by examiner

*Primary Examiner*—Phan Palmer
(74) *Attorney, Agent, or Firm*—Kevin Fortin (57) ABSTRACT

The present invention relates to a light generating device comprising a slab light guide (1), at least one light input unit (2) arranged on at least one side (10) of said light guide (1) comprising at least one light source (20) and a light incoupling means (21) for coupling light into said light guide (1), and at least one light output unit (3) arranged on at least one side (11) of said light guide (1). In order to provide a device that provides polarized light of a high homogeneity the light output unit (3) according to the present invention comprises a polarized light emitting waveguide plate (31) for selectively coupling light of a first polarization state out of said light guide (1).

The present invention further relates to a display device, in particular an LCD, comprising a light generating device according to the invention.

13 Claims, 7 Drawing Sheets

LIGHT GENERATING DEVICE HAVING POLARIZED LIGHT EMITTING WAVEGUIDE PLATE

The present invention relates to a light generating device comprising a slab light guide, a light input unit and a light output unit. Further, the present invention relates to a display device and an LCD television set.

Currently used slab light guides, such as those used for the back-illumination of thin LC display screens, are typically of the edge-lit (also called side-lit) type where a light source, partially surrounded by a reflector, is positioned adjacent to at least one of the edges of the light guide such that its light is directed into the light guide via its edges. Such a slab light guide is, for instance, disclosed in WO 01/63588 A1. Light captured in the light guide propagates through the light guide via total internal reflections (TIR) and is normally coupled out of the light guide and directed away from the light guide via optical interactions of the propagating light inside the light guide with light scattering and/or reflecting/refracting means such as scattering dots, scattering surface patterns, or other optical "irregularities" provided to the light guide surfaces, or via specially produced topographies in/on the light guide surfaces, all light scattering and/or reflecting/refracting means having in common that they "frustrate" the total internal reflections and induce light outcoupling from the light guide. Alternatively, specially textured optical foils may be brought into optical contact with the light guide for the purpose of light outcoupling and its subsequent directing. With such a set-up it is possible that the entire edge-lit backlight can be contained within a space having only a small thickness, which is important for applications involving i.e. thin notebook screens or thin LC monitor screens.

A polarized light emitting waveguide plate for anisotropically scattering light having a particular polarization state, for instance s-polarized light, out of a light guide, which is preferably used in a liquid crystal display, is described in WO 01/90637 (PHNL 000294 EPP). Said waveguide plate comprises an entrance side for coupling light into the waveguide plate, a major exit surface for coupling light out of the waveguide plate and polarization means for selectively directing a component of a first polarization state of light coupled in via the entrance side towards the exit surface, the polarization means comprising an anisotropically light scattering layer which selectively scatters the component of the first polarization state towards the exit surface. Thus, light recycling in a light guide is used to make an LCD-panel more efficient. The idea is to reflect p-polarized light at the surface of an anisotropic foil while s-polarized light is scattered out of the light guide. The p-polarized light can be recycled as depolarisation occurs in the light guide.

However, using such a waveguide plate, light recycling and extraction of s-polarized light is too efficient. It has been found that depolarisation can occur at a distance of just a few millimeters, thus giving rise to loss of homogeneity in the light flux. A few centimeters away from the light source most of the light is already extracted resulting in a decrease of intensity.

It is therefore an object of the present invention to provide a light generating device which overcomes the above described problems, which in particular generates polarised light having a high homogeneity and is suitable for use in an LCD panel of the backlighting type.

This object is achieved according to the present invention by a light generating device as claimed in claim 1 comprising
a slab light guide having two substantially parallel sides and at least one edge, the edge having a surface connecting the surfaces of said sides,
at least one light input unit arranged on at least one side of said light guide comprising at least one light source and a light incoupling means for coupling light into said light guide, and
at least one light output unit arranged on at least one side of said light guide comprising a polarized light emitting waveguide plate for selectively coupling light of a first polarization state out of said light guide.

The present invention is based on the idea to provide at least one light input unit and at least one light output unit which, dependent on the application and contrary to the known devices, can be arranged anywhere at any position on at least one side of said light guide. This enables the light guide to act as a light buffer between the light input and light output units which are not directly optically coupled to each other. Light buffering inside the light guide promotes light intensity homogenisation to be attained across the surface area of the at least one side of the light guide covered by the at least one light output unit, which is advantageous for obtaining outcoupled light of a rather uniform lateral brightness level. The indirect degree of coupling between the light input and light output units via the light guide has a proportionality to their respective areas of optical contact with the light guide, i.e. to their apertures, and additionally depends on the positioning of the respective light input units and light output units on at least one side of the said light guide with respect to each other.

According to the invention a polarized light emitting waveguide plate for selectively coupling light of a preferred polarization state out of the light guide is provided in the light output unit. Thus, only the light with the preferred polarization state, e.g. s-polarized light, will be extracted out of the light guide, thus achieving efficient polarized light recycling without loss of homogeneity. Further, the fabrication of such a light generating device is quite easy. The light generating device according to the invention is preferably used in an LCD display device of the direct back-lighting type or an LCD television set with scanning back light which is a known option to reduce motion artefacts in LCD television sets.

The number of light sources, e.g. lamps, used in the light input units can be scaled with the side area of the light guide and can thus be made to scale with a display screen surface area that must be illuminated or with the surface area of a light-emitting luminaire tile. This allows light generating devices to be created that, dependent on the details of their design, enable a high degree of lateral brightness uniformity to be attained at high brightness levels pertaining to the emitted light from the at least one light output unit arranged on at least one side of said light guide, or enable light concentration or light dilution to be accomplished. Furthermore, dependent on the design parameters of the at least one light output unit, light can be emitted from the light generating device that possesses a certain degree of collimation. This is useful, e.g. for illuminating a LCD screen positioned directly adjacent to the at least one light output unit.

Preferred embodiments of the invention are defined in the dependent claims. A display device, in particular a liquid crystal display device of the direct back-lighting type, comprising a display screen, in particular a LCD screen, and a light generating device according to the invention is claimed in claim 14. A LCD television set comprising a light generating device according to the invention is claimed in claim 15.

In the context of the invention, a polarized light emitting waveguide is a waveguide which selectively emits light of a first polarization state with respect to light of a second polarization state orthogonal to said first polarization state. The polarization selectivity of the emitted light is defined as the ratio of the emitted amount of light of a first polarization state to the emitted amount of light of a second polarization state orthogonal to said first polarization state. The transmissivity of the waveguide plate is the ratio of the amount of light emitted via the exit surface to the amount of light entered via the entrance side.

The incident light coupled in via the entrance side of the waveguide plate is guided through the plate by total internal reflection in directions more or less parallel to the exit surface. Generally, this incident light is substantially unpolarized, that is to say, it contains components of the first and the second polarization state in equal amounts. As this light travels through the anisotropically scattering layer, the component of the first polarization state is scattered to a larger extent than the component of the second polarization state.

Conversely, the component of the second polarization state is transmitted to a larger extent than the first component, that is to say, the second component is selectively transmitted and hence remains captured in the waveguide plate. Scattered light traveling towards the exit surface and incident on the exit surface at an angle not satisfying the condition for total internal reflection will be refracted and exit the waveguide plate via the exit surface.

The thickness of the waveguide plate is attuned to the amount of light needed for a particular application at hand and the size of the light source used to provide light to the waveguide plate. If the plate is too thin, the spreading of the light is less efficient, whereas if it is too thick weight is added unnecessarily. Conveniently, the thickness is between 0.1 and 50 mm, or better 0.25 to 20 mm. A good balance between efficient spreading and weight of the plate is struck at a thickness of 0.5 mm to 10 mm.

In order to efficiently illuminate a display panel of an LCD device comprising the waveguide plate in accordance with the invention, the transmissivity of the waveguide plate with respect to the component of the first polarization state (that is the component to be coupled out via the exit surface) in the direction of waveguiding may be selected such that any light which reaches the side opposite from the entrance side comprises to some extent said component of the first polarization.

Preferred embodiments of the anisotropically light scattering layer which can be applied in the light generating device according to the present invention are disclosed in the above mentioned WO 01/90637 (PHNL 000294 EPP), which disclosure is herein incorporated by reference.

In an alternative embodiment, the waveguide plate of the output unit comprises a micro-structured anisotropic light outcoupling layer providing mainly the same effect as the above-described anisotropically light scattering layer. In addition, a protective coating can be provided on top of said anisotropic layer on the side facing away from the light guide. Preferred embodiments of the micro-structured anisotropic light outcoupling layer are defined in claim 4.

In an advantageous embodiment, the waveguide plate comprises a hologram outcoupling layer as described in European Patent application 011206666.1 (PHNL010683). Therein the Bragg angle is preferably 90° or the thickness of the hologram outcoupling layer is chosen such that outcoupling is polarization-selective.

In another embodiment of the invention a reflective polarizer and outcoupling structure, as for instance described in U.S. Pat. No. 5,808,713, is provided which is preferably a broad band cholesteric network, a multilayer film or a wire grid polarizer.

The light incoupling means of the light input units preferably comprises a plurality of incoupling optical elements being in optical contact with the surface of the side of said light guide on which the at least one light input unit is arranged. Such incoupling optical elements can be in the form of ribs or cubes or cylinders possessing a round or oval cross section, having different sections and surfaces, as defined further in claims 10 to 14.

According to an advantageous embodiment, the light guide is provided with light reflection means, in particular a specular or diffuse reflector, at its edge, the diffuse reflector being substantially not in optical contact with the light guide. Thus, the light rays will be forced to propagate through the light guide via TIR until they exit the light guide either via the light input unit or via the light output unit. An additional reflecting surface is preferably positioned behind and/or around the at least one light source in the at least one light input unit, that is, in the direction away from the light incoupling means, to redirect light rays propagating away from the light incoupling means back towards the light incoupling means. The presence of the said additional reflecting surface allows light recycling to be accomplished within the light input unit.

Preferably, for use as a homogeneously light-emitting back-lighting unit for a large-area LC display screen, the light input unit is spread across the whole surface area of the side of the light guide on which it is arranged. Further, individual light sources can be regularly positioned along this side within the light input unit. Similarly, the light output unit can be spread across the whole surface area of the side of the light guide on which the light output unit is arranged.

The invention will now be explain in more detail with reference to the drawings in which.

Figure 1:
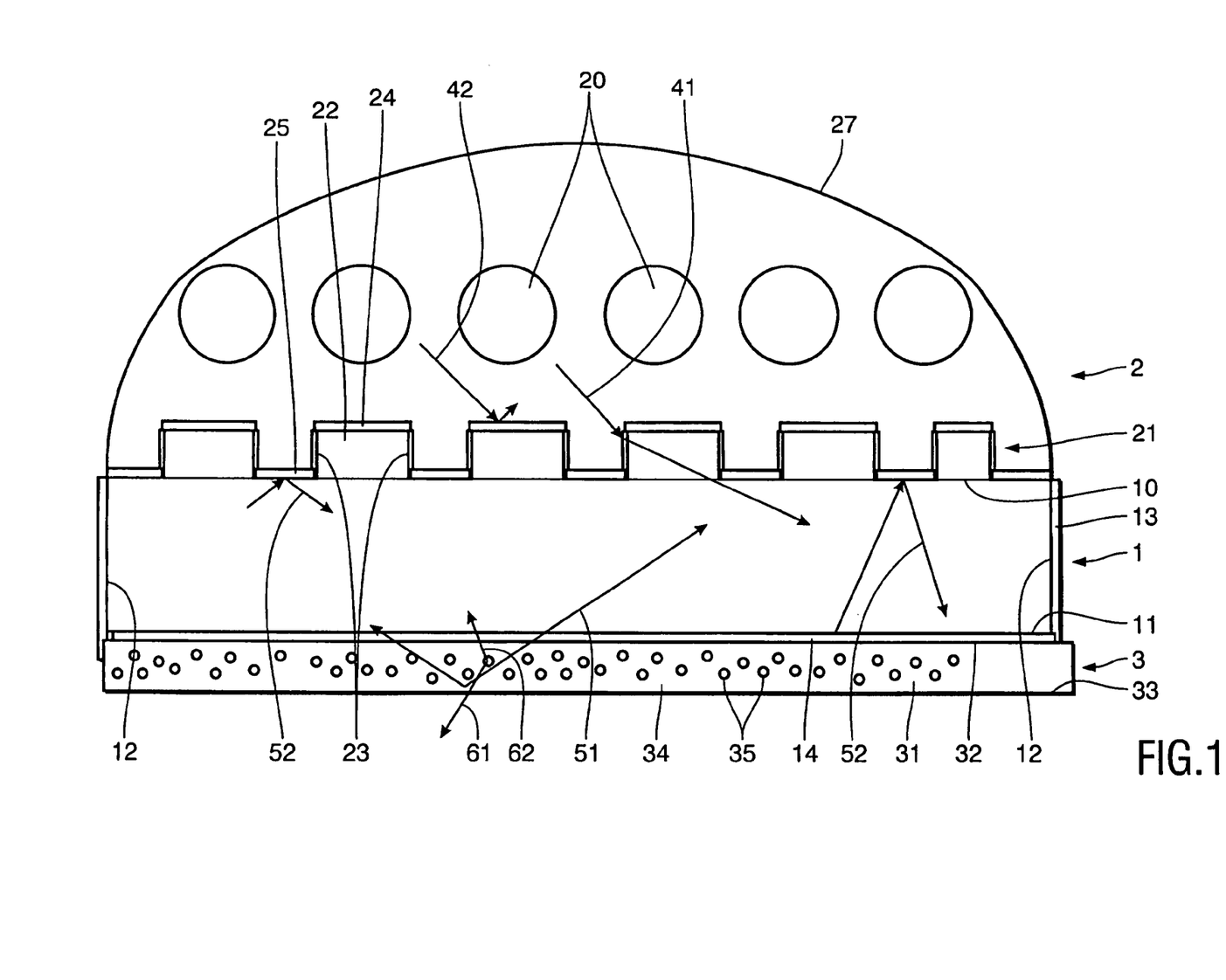
FIG. 1 shows a first embodiment of a light generating device having an anisotropically light scattering layer.

FIG. 1 shows a first embodiment of a light generating device according to the present invention. Said device comprises a slab light guide 1, a light input unit 2 arranged on one side of the light guide 1 and a light output unit 3 arranged on another side of the light guide 1. The light guide 1 has two substantially parallel sides 10, 11 and an edge 12 which has a surface connecting the surfaces of the sides 10, 11. The light input section 2 covers the entire side 10 of the light guide 1; the light output section 3 covers the entire side 11 of the light guide 1.

Within the light input unit 2 five lamps 20 are provided at equal intervals for generating light. For incoupling the generated light into the light guide 1 the light input unit 2 further comprises light incoupling means 21 comprising a plurality of incoupling optical elements 22 in the form of ribs or cubes or upstanding cylinders of round or oval cross section in optical contact with the flat light guide surface 10. The upstanding surfaces 23 of the optical elements 22 aligned substantially perpendicularly to the light guide surface 10 are optically smooth and serve to couple light 41 from the light input unit 2 into the interior of the light guide 1. The surfaces 24 of the optical elements 22 aligned parallel to the light guide surface 10 are covered with a reflecting layer, preferably made of aluminium and having a reflectivity of substantially 100%, to prevent any light entering the light guide 1 that cannot propagate through the light guide 1 by TIR. Preferably, the surfaces 24 of the optical elements 22 are diffusely reflective at the side of said surfaces 24 facing away from the light guide 1 to reflect light 42 within the light input unit 2.

The light input unit 2 including the light sources 20 is at least partly surrounded by a diffuse reflector 27, except of course when the sun or an external light source shall be used as a light source for generating light 4 to be coupled into the light guide 1. Said diffuse reflector 27 preferably has a reflectivity of 100% to maximize the lumen output and light recycling efficiency within the light input unit 2.

Captured light rays propagate through the light guide 1 via TIR. They may exit either via the upstanding walls 23 of the incoupling optical elements 22 of the light incoupling means 21, which brings them back in the cavity of the light input unit 2 containing the light sources 20 from where they can be recycled and again coupled into the light guide 1, or they may exit through the waveguide plate 31 of the light output unit 3.

The waveguide plate 31 has an entrance side 32 for coupling in light and a major exit surface 33 for coupling out polarized light. The waveguide plate 31 comprises polarization means for selectively directing a component of a first polarization state of light coupled in via the entrance side 32 towards the exit surface 33 in the form of an anisotropically light scattering layer which selectively scatters the component of the first polarization state towards the exit surface 33. The layer comprises, in a preferred embodiment, a continuous phase 34 in which a disperse phase 35 is dispersed. The refractive indices of the continuous and the disperse phase are attuned to one another such that along a first axis orthogonal to the direction of waveguiding (normal to the entrance side 32) the refractive index of the disperse phase and the continuous phase are substantially mismatched, whereas along a second axis orthogonal to both the direction of waveguiding and said first axis the refractive indices are substantially matched. Alternatively, the first axis may be oriented parallel to the normal to the entrance side 32 or the normal to the exit surface 33.

The waveguide plate 32 can be developed further and can be provided with additional elements, such as, for instance, a reflector for redirecting any scattered light incident thereon towards the exit surface 33, a reflector 12 for redirecting any light transmitted by the waveguide plate into a waveguide plate and/or a dichroic polarizer arranged between the waveguide plate 31 and an external display panel to further enhance the polarization selectivity. In this regard, reference is again made to WO 01/90637 describing further embodiments of a waveguide plate which can generally all be used in the light generating device according to the present invention.

Typical trajectories of polarization components of light rays traveling through the light guide 1 and the waveguide plate 31 are also shown in FIG. 1. A light ray 51 of unpolarized light comprising equal amounts of s-and p-polarized light enters the waveguide plate 31 via the entrance side 32. While traveling through the continuous phase 34 of the anisotropically light scattering layer 31, it encounters a disperse phase area 35. The refractive index of the disperse phase 35 for p-polarized light is substantially matched to that of the continuous phase 34 of the anisotropically light scattering layer 31 and thus the p-polarized component is substantially transmitted. The refractive index of the disperse phase 35 for s-polarized light is mismatched with that of the continuous phase 35. The mismatch results in scattering of the incoming light ray 51 into a bundle of scattered light rays 61, 62 at least a fraction of which, i.e. light ray 61 being s-polarized, is directed towards the exit surface 33. Polarization selection is thus obtained. Other light rays 62, being p-polarized, are scattered back into the light guide 1 where they, as shown for light rays 52, are recycled by total internal reflections, i.e. by specular reflections at reflecting surfaces 25, 13 and 14. Thus, efficient polarized light recycling is achieved without loss of homogeneity of the outcoupled light 61.

The light generating device according to the present invention comprising a slab light guide, a light input unit and a light output unit, enables the light guide 1 to act as a light buffer between the input and output units 2, 3. These units 2, 3 are not directly optically coupled to each other, the (indirect) degree of optical coupling between them has a proportionality with their apertures, i.e. their respective areas of optical contact with the light guide 1. The extent of light buffering between the light input unit 2 and light output unit 3 possesses therefore an inverse proportionality to the aperture of both the input and output units 2, 3. The (indirect) degree of optical coupling between the units 2,3 additionally depends on the positioning of the respective units 2,3 with respect to each other on the sides of the light guide 1.

At the edges 12 of the light guide 1, TIR light propagating into one direction is back-reflected by means of a specular or, preferably, diffuse reflector 13, the latter preferably not being in optical contact with the light guide 1. This enables an additional smoothing of the light intensity across the light guide 1.

Figure 2:
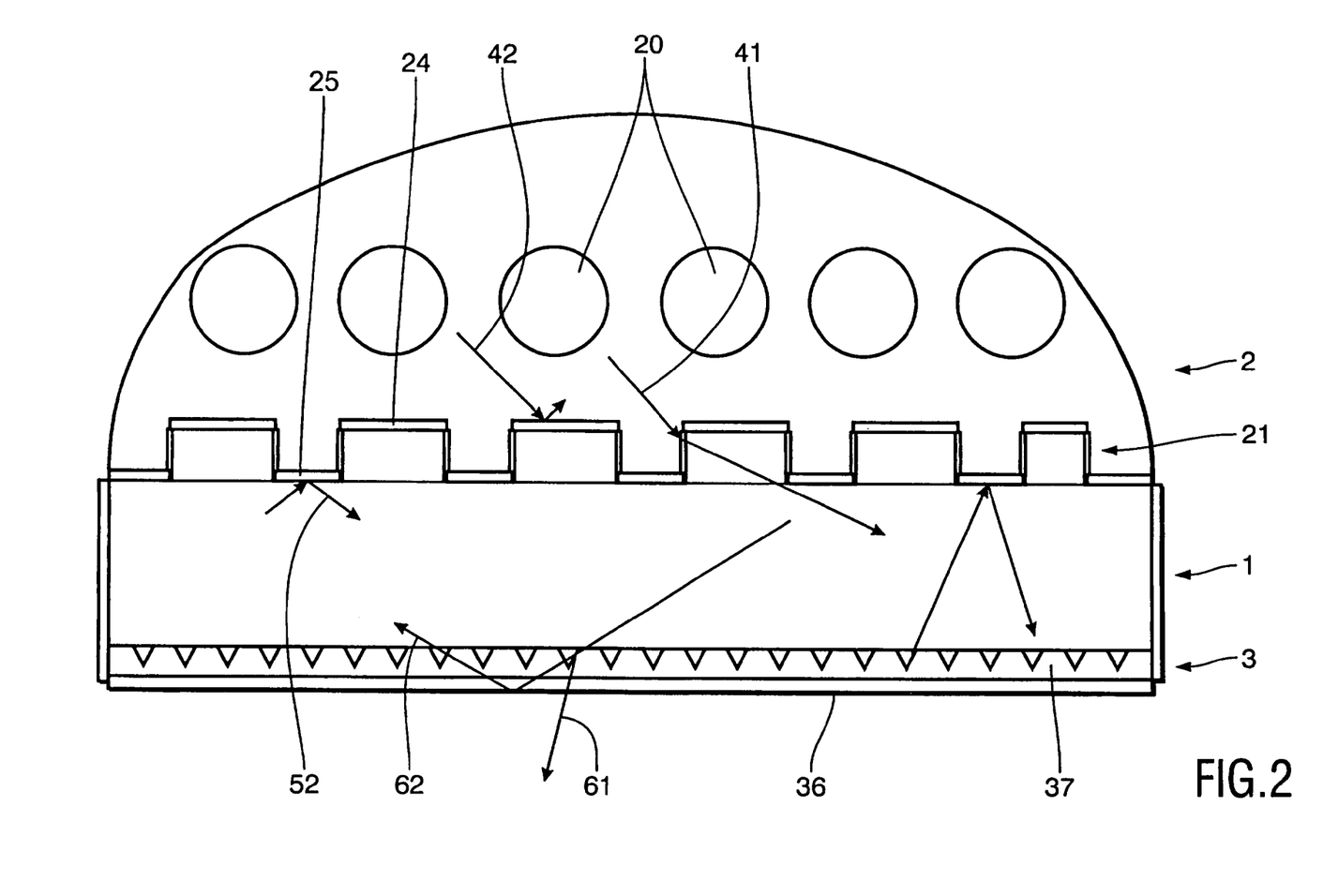
FIG. 2 shows a second embodiment of a light generating device having a microstructured anisotropic layer.

FIG. 2 shows another embodiment of a light generating device according to the present invention. Therein the light output unit 3 comprises, instead of the anisotropically light scattering layer shown in FIG. 1, a micro-structured anisotropic layer 37 covered from the outside by an optional protective coating 36. The micro-structured anisotropic layer 37 generally fulfils the same function as the anisotropically scattering layer 31 as described above, i.e. also with the embodiment shown in FIG. 2 light of a particular state of polarization, e.g. s-polarized light, can be selectively and homogeneously emitted over the whole side 11 of the light guide 1.

S-polarized light that is scattered back towards the reflectors 24, 25 of the light incoupling elements 21 may escape from the light guide 1 even if depolarisation occurs. However, when applying the embodiments of the light generating device shown in FIGS. 1 and 2 in a liquid crystal display, where the LCD panel is located below the light output unit 3, the LCD panel itself will select the s-polarization by its polars. A small loss of light will be the result, but the contrast is still sufficiently good.

Figure 3:
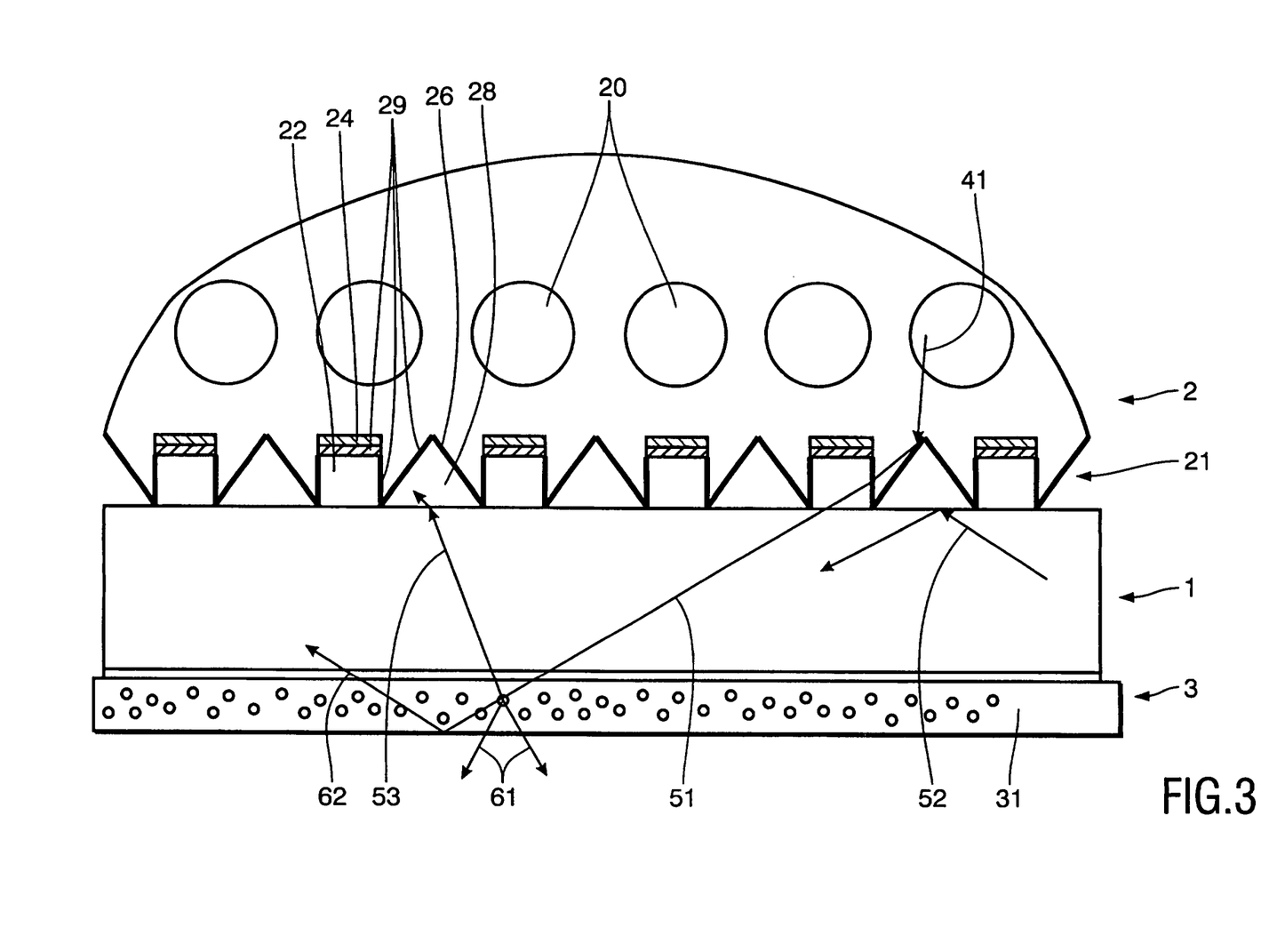
FIG. 3 shows a third embodiment of the light generating device having absorption means for absorbing non-TIR light rays.

There is, however, the possibility to omit the first polar in the LCD panel, thus making it cheaper in total, if only light with s-polarization can escape from the light guide 1. This can be achieved when light absorption means are provided to prevent non-TIR light escaping the light guide 1 through the light output unit 3. This is illustrated in FIG. 3 showing a third embodiment of a light generating device according to the invention. Therein the light output unit 3 comprises an anisotropically polarized light scattering layer 31 as illustrated in FIG. 1. The light incoupling means, however, comprise, besides the adjacent optical elements 22 which are arranged at equal intervals along the side 10 of the light guide 1, a shaped foil or mask 26 having a diffusely or specularly reflecting layer on the side facing the light sources 20. This shielding foil 26 shields the light guide surface between adjacent optical elements 22 from direct exposure to the light generated by the light sources 20 and is preferably not in optical contact with the light guide 1 so that cavities 28 are formed between the foil 26 and the light guide surface 10.

Further, the surface of the optical elements 22 and the shaped foil 26 facing the light guide 1 is covered by an absorption layer 29, e.g. a black coating, in order to absorb light rays 53 having a non-TIR angle so as to prevent non-TIR light from escaping the light guide 1. Thus, a full TIR mode is maintained so that one polar of an LCD device can be omitted.

Figure 4:
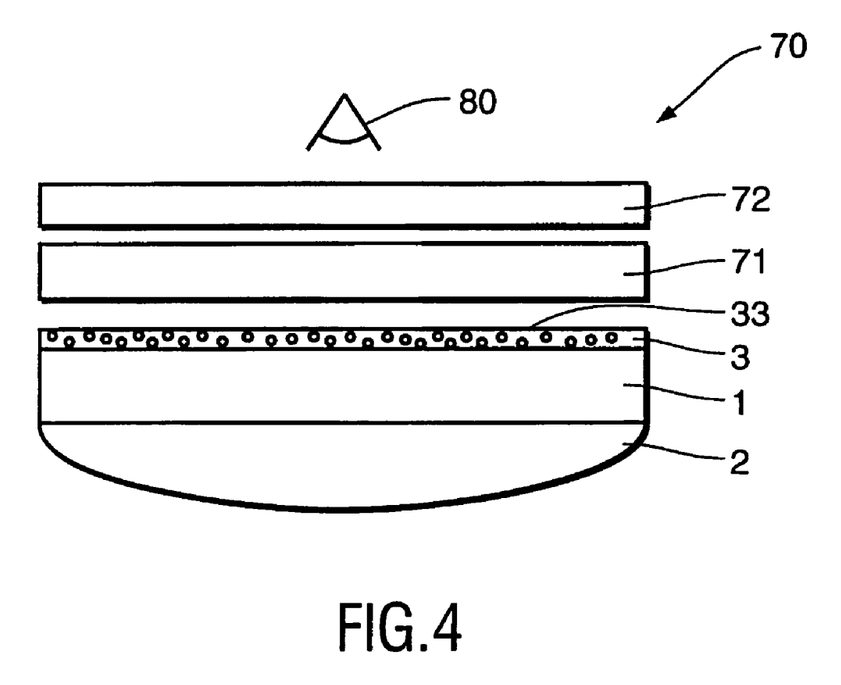
FIG. 4 shows a liquid crystal display device according to the invention.

FIG. 4 schematically shows, in a cross-sectional view, a liquid crystal display device of the back-lighting type comprising a light generating device in accordance with the invention. The LCD device 70 comprises an LCD panel 71 which, in general, includes an LC cell dispersed between transparent ITO electrodes. The device 70 further comprises a light generating device as described above having a light input unit 2, a light guide 1 and a light output unit 3 including a waveguide plate for selectively directing polarized light to the exit surface 33. The LCD device 70 further comprises an analyzer/polarizer 72 arranged between the viewer 80 and the panel 71.

The LCD device 120 is of the back-lighting type, thus being capable of displaying picture information using light generated from the light input unit 2. As is well known in the art, depending on the particular LC cell used, mutual orientation of the analyzer 72 and the optional polarizer(s) enables different LC effects to be obtained. With no voltage on a pixel of the panel 71, polarized light emitted from the light output unit 3 enters the panel 71. As it passes the LC cell the polarization of the light is turned by 90° so that it cannot pass the analyzer 72: the pixel appears dark. With the pixel in the ON state, the polarization of the light is not changed in the panel 71 and thus the light is able to pass the analyzer 72 unhindered: the pixel appears white.

Figure 5:
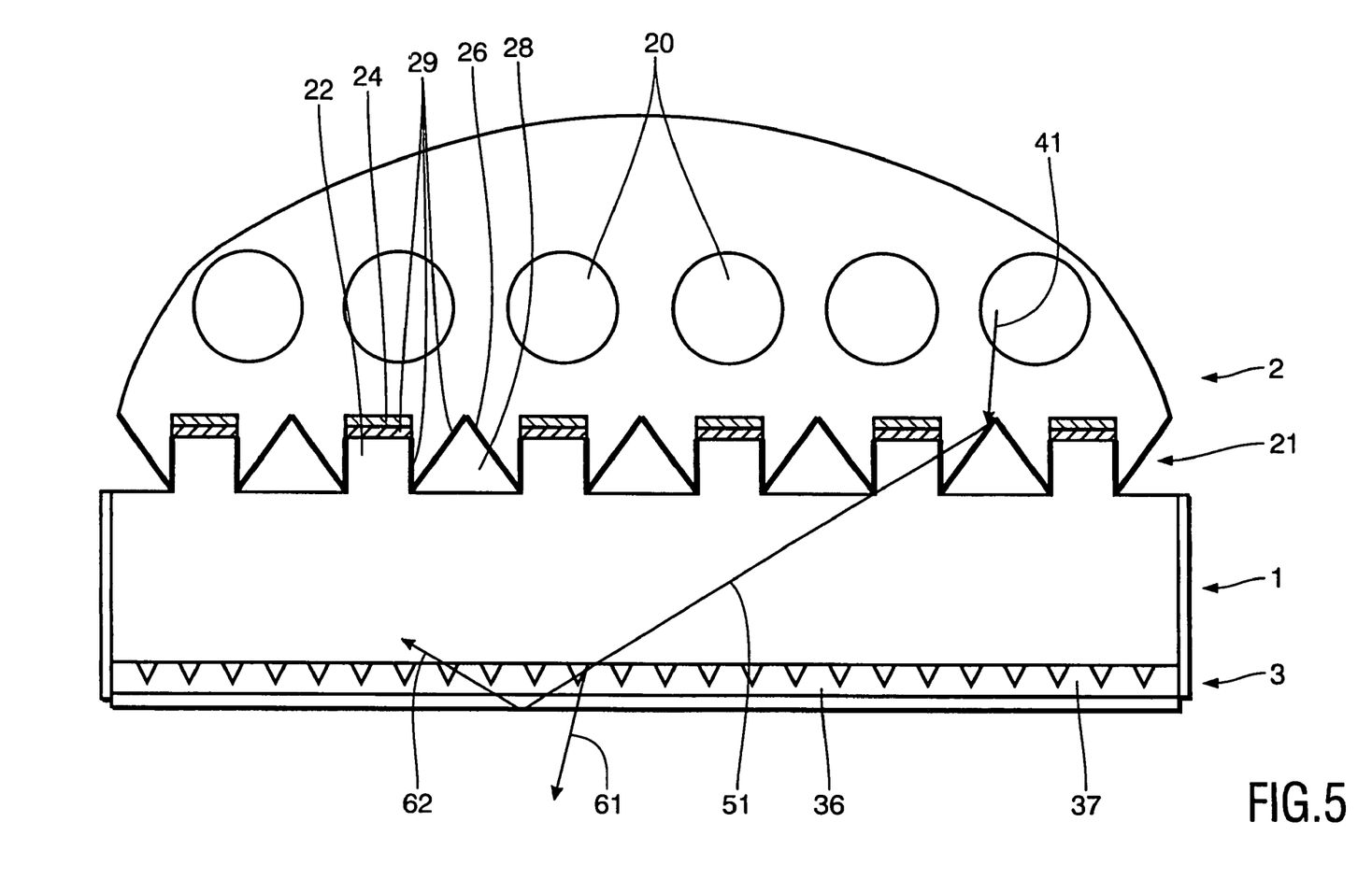
FIG. 5 shows a fourth embodiment of a light generating device having a microstructured anisotropic layer.

Another embodiment of a light generating device according to the present invention is shown in FIG. 5, which is a combination of parts of the embodiments shown in FIGS. 2 and 3. The light incoupling structure 2 is adapted as shown in FIG. 2 using an array of ridges or prisms as light incoupling means 21. The light guide 1 and the light output unit 3 is adapted as shown in FIG. 2, i.e. the light output unit 3 comprises a micro-structured anisotropic layer 37 for selectively outcoupling s-polarized light. Thus a high control over the light emission direction can be achieved with this embodiment.

Figure 6:
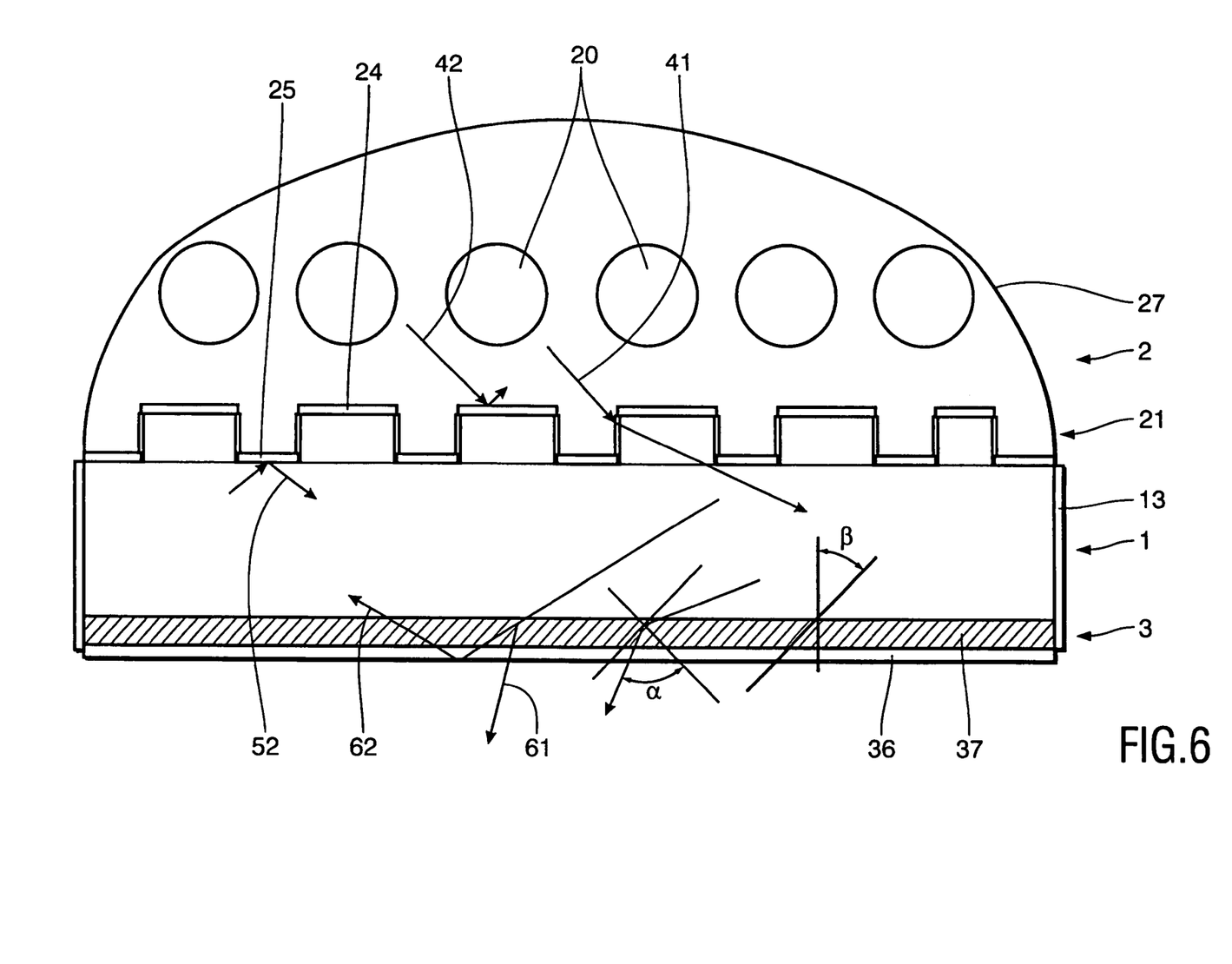
FIG. 6 shows a sixth embodiment of a light generating device having a holographic outcoupling layer.

FIG. 6 shows an embodiment of the light generating device according to the present invention using a holographic outcoupling layer. While the light input unit 2 and the light guide 1 are adapted as shown in FIG. 2, the light output unit 3 comprises, besides the optional protective coating 36, a hologram outcoupling layer 38. At the hologram, one polarization of the incident light 51 is selectively coupled out if either the Bragg angle α is 45° or if the thickness of the layer 38 is suitably chosen. Thus light of s-polarization 61 is selectively coupled out.

FIG. 6 also shows the hologram tilt angle β, which is the angle between the normal to the grating planes and the stacking direction, the stacking direction being the direction in which the grating planes are stacked. The hologram may be thought of as a stack of grating planes, the refractive index being constant within each grating plane and different between adjacent planes. Regarding a more detailed description of such a hologram layer 38 reference is made to the above mentioned European patent application 01 120 366.1 (PHNL 010683). This embodiment has the advantage of a simple outcoupling construction requiring no micro-structuring and no Moire interference.

Figure 7:
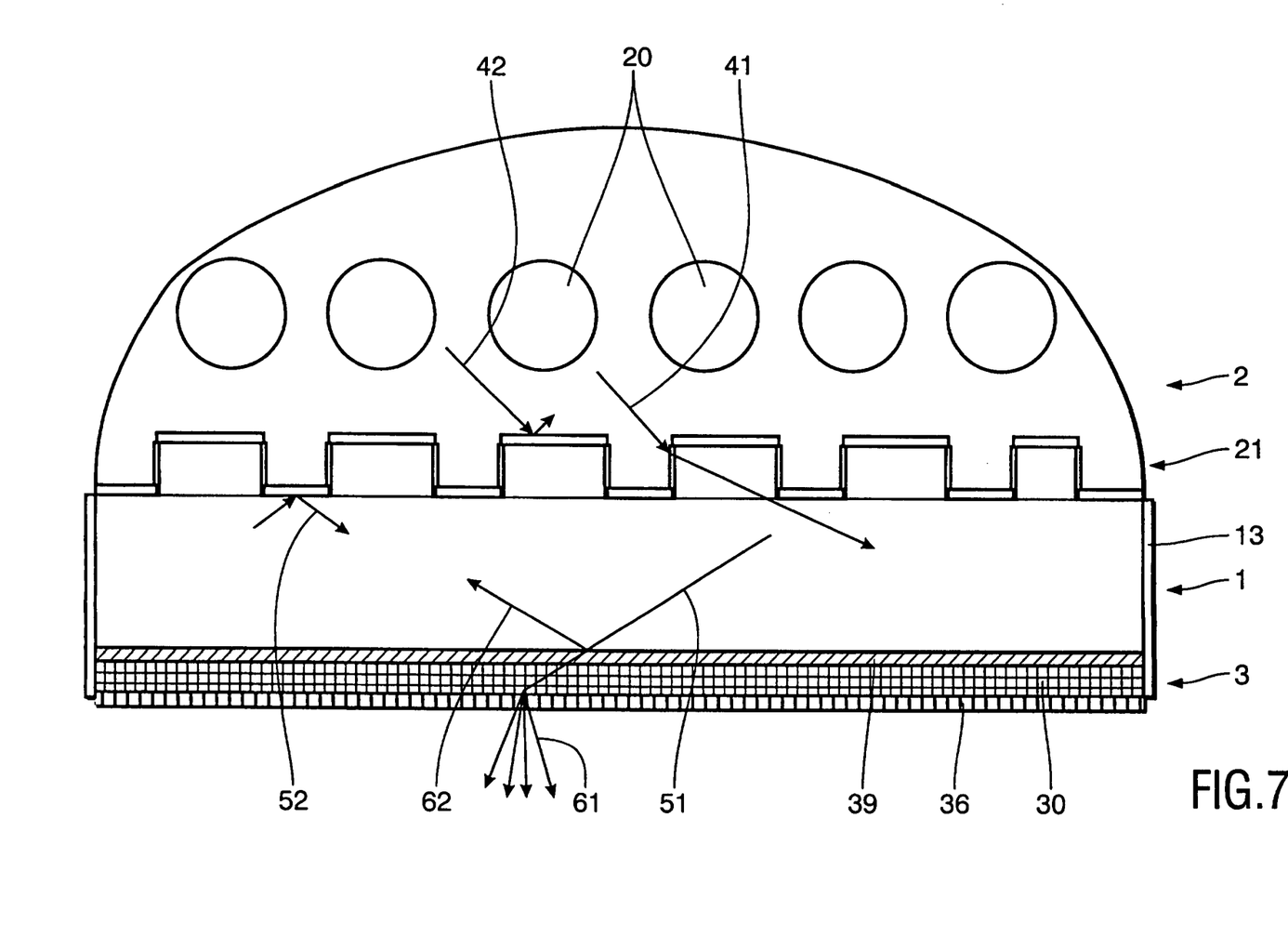
FIG. 7 shows a seventh embodiment of the light generating device having a reflective polarizer.

FIG. 7 shows still another embodiment of a light generating device according to the present invention. The light input unit 2 and the light guide 1 are again adapted as shown in FIG. 2. The light output unit 3 comprises, besides the optional protective coating 36, a reflective polarizer 39, which selects the light having a particular polarization. Thus, light having a particular polarization, e.g. s-polarization 61, can be selectively coupled out by an outcoupling layer 30. Light of a different polarization, e.g. p-polarization 62, is reflected on the reflective polarizer 39. This embodiment has the advantage of being independent of the outcoupling construction, e.g. different outcoupling layers 30 can be used in this embodiment.

The present invention provides a light generating device in which the light guide acts as a light buffer. Selectively polarized light of a preferred polarization state is emitted homogeneously. The layout of the device is simple, which can be used in a wide range of different applications.

The invention claimed is:

1. A light generating device comprising:
   a slab light guide having two substantially parallel sides and at least one edge, the edge having a surface connecting the surfaces of said sides;
   at least one light input unit arranged on at least one side of said light guide, the light input having at least one light source and a light incoupling means for coupling light into said light guide;
   at least one light output unit arranged on at least one side of said light guide comprising a polarized light emitting waveguide plate for selectively coupling light of a first polarization state out of said light guide,
   wherein said waveguide plate comprises a micro-structured anisotropically light outcoupling layer.

2. A light generating device as claimed in claim 1, wherein said light incoupling means comprises a plurality of incoupling optical elements being in optical contact with the surface of said at least one side of said light guide, said incoupling optical elements having a reflective surface section facing the light source and being aligned substantially parallel to the surface of a side of said light guide and at least one transparent surface section being arranged at an angle different from 0°, in particular at an angle of substantially 90°, with respect to the surface of a side of said light guide.

3. A light generating device as claimed in claim 2, wherein said incoupling optical elements are arranged at intervals and wherein between said incoupling optical elements light reflecting means are arranged, in particular a structured reflective foil or structured reflective mask that is substantially not in optical contact with said light guide and is reflective on the side facing the light source.

4. A light generating device as claimed in claim 2, wherein said incoupling optical elements and/or said light reflecting means have a light absorbing surface section facing the light guide.

5. A light generating device as claimed in claim 2, wherein said incoupling optical elements are arranged at intervals and wherein between said incoupling optical elements light reflecting means are arranged, in particular a reflective layer in optical contact with said light guide that is specularly reflective on the side facing the said light guide.

6. A light generating device as claimed in claim 2, wherein a reflective surface section of the said incoupling optical elements is diffusely reflective having a reflectivity of substantially 100% at the side of said reflective surface section facing away from the light guide.

7. A light generating device as claimed in claim 1, wherein said light guide is provided with light reflection means in particular a specular or diffuse reflector, at its edge.

8. A light generating device as claimed in claim 1, wherein said waveguide plate comprises a hologram outcoupling layer.

9. A light generating device as claimed in claim 8, wherein the Bragg angle is substantially 45°.

10. A light generating device as claimed in claim 8, wherein the thickness is chosen such that outcoupling is polarization selective.

11. A light generating device as claimed in claim 1, further comprising a reflective polarizer and outcoupling structure.

12. A light generating device as claimed in claim 11, wherein said reflective polarizer is a broad band cholesteric network, a multilayer film or a wire grid polarizer.

13. A light generating device as claimed in claim 1, wherein said micro-structured anisotropically light outcoupling layer is a liquid crystalline polymer or a birefringent polymer, in particular PET or PEN.

* * * * *